United States Patent [19]

Tsujimoto

[11] Patent Number: 5,982,825
[45] Date of Patent: *Nov. 9, 1999

[54] METHOD AND APPARATUS FOR CANCELLING INTERFERENCE JAMMING IN DIGITAL RADIO TRANSMISSION

[75] Inventor: Ichiro Tsujimoto, Tokyo, Japan

[73] Assignee: NEC Corporation, Tokyo, Japan

[*] Notice: This patent is subject to a terminal disclaimer.

[21] Appl. No.: 08/780,176

[22] Filed: Dec. 26, 1996

[30] Foreign Application Priority Data

Dec. 28, 1995 [JP] Japan .................................. 7-342515

[51] Int. Cl.⁶ .............................. H04B 7/10; H04B 7/02; H04L 1/02
[52] U.S. Cl. .......................... 375/347; 375/267; 375/349; 375/206; 370/342; 370/479; 455/101
[58] Field of Search .................................... 375/347, 267, 375/299, 260, 346, 349, 200, 201, 202, 203, 204, 206, 207, 208, 209, 210, 345, 232, 233, 229; 370/342, 320, 335, 479; 455/101, 63, 65

[56] References Cited

U.S. PATENT DOCUMENTS

| | | | |
|---|---|---|---|
| 5,335,359 | 8/1994 | Tsujimoto et al. ...................... | 455/52.3 |
| 5,379,046 | 1/1995 | Tsujimoto ................................ | 342/378 |
| 5,524,023 | 6/1996 | Tsujimoto ................................ | 375/232 |
| 5,568,523 | 10/1996 | Tsujimoto ................................ | 375/347 |
| 5,636,242 | 6/1997 | Tsujimoto ................................ | 375/200 |
| 5,757,853 | 5/1998 | Tsujimoto ................................ | 375/200 |

OTHER PUBLICATIONS

Japanese Office Action dated Jun. 16, 1998, with partial translation.

*Primary Examiner*—Stephen Chin
*Assistant Examiner*—Michael W. Maddox
*Attorney, Agent, or Firm*—McGinn & Gibb, P.C.

[57] ABSTRACT

At a transmitter side, signals are provided with a delay difference with a plurality of branches, coded multiplexed by spectrum spreaders and a combination unit, and transmitted by a single antenna. At a receiver side, the signals are received by a single antenna, and diversity branches are extracted and separated by first and second spectrum de-spreaders. They are subject to linear combination so that the mean square of the decision error signals is minimized. The output passes through an adaptive matched filter and an adaptive equalizer so as to provide an output from which interference waves are eliminated. Thus, interference is eliminated and diversity gain for a signal is ensured, while reducing the scale and cost of a system without using a plurality of antennae.

25 Claims, 6 Drawing Sheets

METHOD AND APPARATUS FOR CANCELLING INTERFERENCE JAMMING IN DIGITAL RADIO TRANSMISSION

BACKGROUND OF THE INVENTION

The present invention generally relates to a method and apparatus such as a diversity receiver, for cancelling interference jamming in digital radio transmission where severe multi-path fading causes problems by utilizing coded multiplexing with spread spectrum, while maintaining a diversity effect.

DESCRIPTION OF THE RELATED ART

Diversity receivers are known as equipment for deleting random nonsynchronous unintentional returns in, for example, a beacon system.

Fading typically occurs on a radio propagation path. The fading includes flat fading and selective fading. Flat fading does not cause multipath propagation, but causes received waves themselves to be directly subject to variations in amplitude and phase during propagation. Conversely, selective fading causes multi-path propagation, and incoming waves on each of multiple paths are subject to separate variations of amplitude and phase.

In this case, because the received signal is a composite wave having a plurality of multi-path waves, specific frequencies are combined in anti-phase depending on the state of phase variation. That is, frequency selective fading (e.g., notch) occurs in the received spectrum. In the case of flat fading, variation of the receiving level is a problem, and the received waveform itself is not distorted.

However, in the selective fading by multi-path, in addition to variation of the receiving level, distortion occurs in the received waveform. For radio communication where such fading occurs, diversity reception is usually and widely employed, and is essential technology.

In radio transmission, in addition to the multi-path fading, problems also are caused by various interference waves such as adjacent channel interference, radar interference, and military jamming waves. Frequency interference is an unavoidable problem, particularly, when it is intended to increase transmission capacity within limited frequency resources.

Various approaches have been studied for cancelling interference jamming. One conventional approach is to eliminate interference waves by linearly combining branch signals from a plurality of antennae. For example, interference is eliminated by pattern null using an adaptive antenna.

However, such an interference elimination method utilizing the diversity branch uses up the diversity branch for elimination of interference, so that the diversity effect is not necessarily obtained for desired waves. Although interference waves may be canceled by each other by linearly combining a plurality of branches, the desired waves are not always combined at the maximum ratio. The desired waves also may be canceled out.

To solve this problem, a conventional method has been developed which enables the diversity composite effect to coexist with the interference elimination effect. There is, for example, a diversity receiver described in Japanese Patent Application Laid-Open No. 4-35546 and in corresponding U.S. Pat. No. 5,335,359, incorporated herein by reference.

FIG. 7 is a block diagram showing its transmitter side, while FIG. 8 is a block diagram showing its receiver side.

In FIG. 7, a retardation (delay) element 301 with delay time of τ which is set preferably within a half of the matched filter length (e.g., an integral multiple of the symbol interval T), transmitters 302, 303, and transmitting antennae 316, 317. The matching filter length is the time span covered by taps of the matched filter. In FIG. 8, 318 and 319 are receiving antennae, 304 and 305 are automatic gain control (AGC) amplifiers, and 306 and 307 are complex multipliers. 308 and 309 are complex correlators (e.g., each of which may include a multiplier for correlating the applied signals in complex form and an integrator for averaging the correlations), 310 is a combination unit, 311 is an AGC amplifier, 312 is a selector, 313 is an adaptive matched filter, 314 is a decision feedback equalizer (DFE), and 315 is an attenuator.

The transmitter side of the diversity receiver in FIG. 7 divides a transmitting signal into two branches by a divider 300, and provides a delay time difference τ. It transmits the transmitting signals of these two branches from separate antennae 316 and 317, respectively.

On the other hand, the receiver side in FIG. 8 performs diversity reception with two antennae 318 and 319. In this case, a transmission output 1 is input into the receiving inputs 1 and 2. Similarly, a transmission output 2 is input into the receiving inputs 1 and 2. Additionally, interference jamming mixed during propagation of radio waves is also received by the two receiving antennae.

The receiver side applies automatic gain control (AGC) to an output of the combination unit 310 for normalization, and feeds back the output to the correlators 308 and 309 for correlating with received branch signals.

First, the multipliers 306, 307 output signals having a high level under random phase amplitudes. While they are added together by the combination unit 310, these waves do not initially have an in-phase composition. When the output of the combination unit 310 and the received signals are correlated with each other, the phase difference between the output of the combination unit 310 and each received signal, and their amplitude information are obtained as correlated values.

The in-phase composition is atitaiied by multiplying a complex conjugate of these correlated values by the multipliers 306, 307. Since the amplitude is multiplied by a weight coefficient making it square, composition at the maximum ritio is consequently performed for the received signal having a high level.

On the other hand, a subtractor (attenuator) 315 performs an anti-phase composition opposite to the maximum ratio composition to suppress a signal having a high level. If the signal having a high level is unnecessary interference jamming, then interference waves are subject to an in-phase composition at the output of the combination unit 310, while they are canceled in anti-phase as the output of subtractor 315.

Accordingly, a desired signal can be extracted from the output of the subtractor 315.

However, when the desired wave at the output of the subtractor 315 is present, it is merely linearly combined by the weight coefficient for cancelling the interference. On the other hand, the transmitting wave is provided with a delay difference between the branches, so that a fixed delay difference is provided for the desired wave at the output of the selector 312.

That is, a two-wave multi-path model (principal wave+delayed wave) has been produced at the transmitter side.

For such multi-path propagation (e.g., of the principal wave+delayed wave), a typical adaptive equalizer eliminates the delayed wave, while an adaptive matched filter does not eliminate the delayed wave, but positively utilizes it as a signal. Specifically, the principal wave is delayed in the adaptive matched filter to be matched to the timing of the delayed wave, and that timing (e.g., of the delayed wave) is made the new timing for the principal wave.

Control is performed for the amplitude and the phase after the timing of all multi-path waves is matched, and then the maximum ratio composition is achieved. This is equivalent to the diversity composition in the temporal region, and the resulting diversity gain is called an "implicit diversity gain".

The decision feedback equalizer (DFE) of 314 eliminates final interference between codes.

However, in the above system, multiple antennae are required for the transmission and receiving sides, respectively, so that the device becomes unnecessarily large. For microwave communication over a long distance (e.g., more than 100 km), an antenna with a large diameter (e.g., on the order of ~3–10 m) is required. In such a case, the increased number of antennae leads to extremely high system costs.

The above-described conventional method and apparatus effectively act on interference waves having a high level providing negative D/U (a desired power-to-undesired power ratio). However, such a method and apparatus provide uncertain and unpredictable correlation control for a region providing zero or positive D/U (e.g., D/U$\geq$0), so that it cannot effectively eliminate interference.

Further, as mentioned above, the conventional canceller system is suitable for the region where D/U<<0. However, if the desired power is stronger than the undesired power, the Maximum Ratio Combining (MRC) control is locked to the desired power. Thus, for example D/U<–6 dB (the conventional Power Inversion Adaptive Array (PIAA)), and the desired power is cancelled. Thus, the conventional system is suitable only for compensating severe interference (military jamming), and not for compensating for relatively low-level interference at the site or due to adjacent channels.

SUMMARY OF THE INVENTION

In view of the foregoing problems of the conventional systems, it is therefore an object of the present invention to provide a method and apparatus which does not use a plurality of antennae, for cancelling interference even for interference waves having a relatively low level providing positive D/U, and which can provide a diversity gain.

In a first aspect of the present invention, a method and apparatus performs reception by dividing transmitting data into a plurality of branches, code multiplexing them by providing a delay difference to each of them, transmitting them with one antenna receiving the transmitted signals with one antenna, performing diversity composition after they are decoded and separated, and receiving them using an adaptive matched filter and an adaptive equalizer.

Additionally, the present invention includes means for providing a different delay time for each of a plurality of transmitted signals which are formed by dividing a transmitted signal into M branches at the transmitter side, means for individually performing spectrum spreading on the M-branched transmitting signals, means for combining the spread spectrum signals, means for transmitting the combined signals with one antenna, means for receiving them at the receiver side with one antenna, means for dividing the received signals into M branches, and, then decoding them through inverse spectrum-spreading (e.g., spectrum de-spreading) corresponding to the transmitter side, respectively, means for demodulating the inverse spectrum-spread output, means for inputting the demodulated signals into respective complex multipliers for combination, means for inputting the combined signal into an adaptive matched filter, means for inputting the output of the adaptive matched filter into an adaptive equalizer, means for correlating a decision error signal of the adaptive equalizer with the demodulated signals, and means for multiplying the calculated correlation values by the respective complex multipliers.

The above first and second embodiments of the present invention utilize spread spectrum techniques to reduce the interference density in normal or relatively low-level interference.

In a third aspect of the present invention, a hybrid structure is provided including a single antenna which employs coded multiplexing and a Power Inversion Adaptive Array (PIAA), such that the structure is relatively small and compact and yet can effectively compensate for relatively severe interference (e.g., military jamming).

With the invention, the inventive method and apparatus use a single antenna, and eliminates interference even for interference waves having a normal (or relatively low) level providing a positive D/U. Further, a diversity gain is provided.

The first and second embodiments allow a smaller receiver due to a single antenna and yet which is able to provide diversity through coded multiplexing and which is capable of handling normal (or low-level) interference environments.

The third embodiment provides a smaller receiver due to having a single antenna and yet able to provide diversity through coded multiplexing, and which can effectively compensate for relatively severe interference (e.g., military jamming) through a structure incorporating a Power Inversion Adaptive Array (PIAA).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
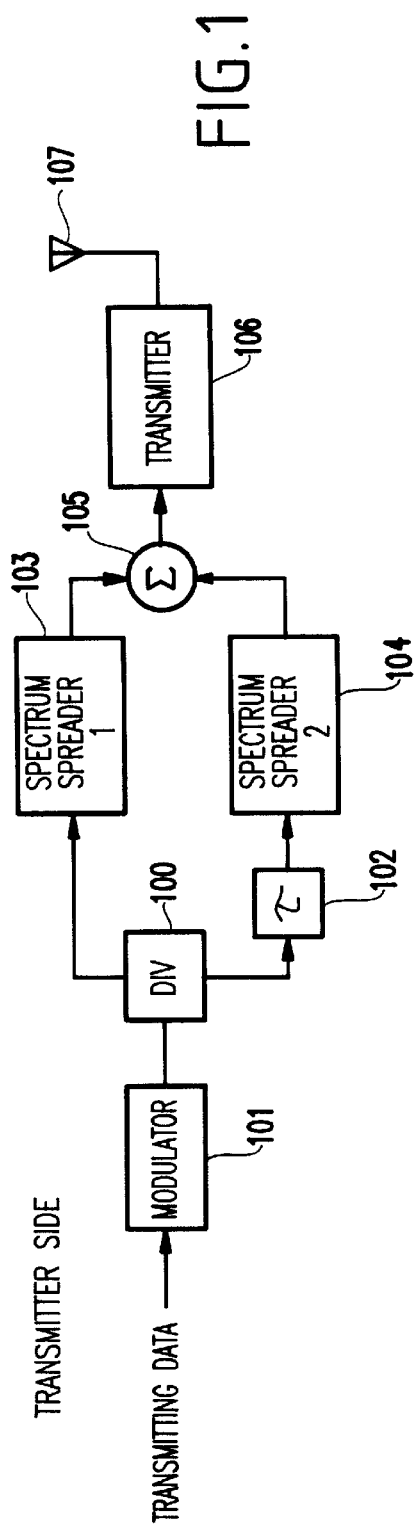
FIG. 1 is a block diagram showing a first embodiment of a transmitter side of an apparatus (e.g., diversity receiver) according to the present invention.
Figure 2:
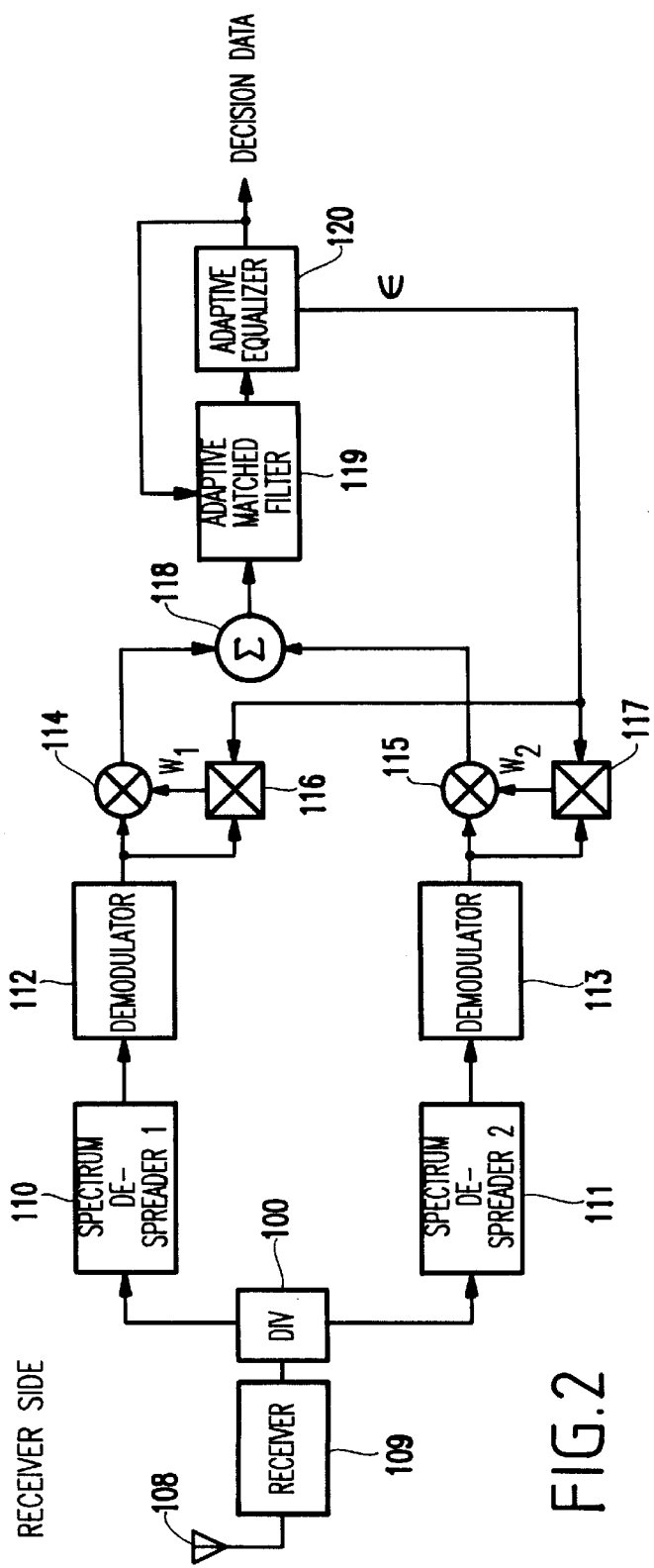
FIG. 2 is a block diagram showing a first embodiment of a receiver side of an apparatus (e.g., diversity receiver) according to the present invention.

Referring now to the drawings, and more particularly to FIGS. 1 and 2, there is shown a first embodiment of the present invention.

FIG. 1 shows the arrangement of the transmitter side, which includes a modulator 101, a retardation (delay) 102 having a delay time of τ, a spectrum spreader 103 which is a first spectrum spreader 1, a spectrum spreader 104 which is a second spectrum spreader 2, a combination (e.g., summing) unit 105, a transmitter 106, and a single transmitting antenna 107. The structure of the individual elements of FIG. 1 is believed to be well-known to one of ordinary skill in the art, and thus for brevity will not be discussed in detail.

In FIG. 1, the modulator 101 receives transmitted data, and applies digital modulation such as quaternary phase-shift keying (QPSK) to a transmitting signal. An output of the modulator 101 is branched (e.g., divided) into two signals by a two-branch distributor (e.g., divider, hybrid splitter or the like) 100, and the signal on a first branch 1 is directly input to the first spectrum spreader 103 without being input through the retardation (delay) element.

The transmitting signal from the second branch 2 is input into the second spectrum spreader 104 through the retardation (delay) element 102 with a delay time of τ. The delay element 102 may be formed from any of a number of known structures such as a bandpass filter, a SAW device or the like.

The spectrum spreaders 103, 104 perform spreading of the respective transmitted signals with independent spreading codes. For example, in the first embodiment of the present invention, a preferred spreading code may be a PN code having a speed less than 20–30 times the speed of the input source signals. Typically, PN codes having a speed of 50 times that of the input signals are employed. However, a high-speed PN code is unnecessary since interference is at a relatively low-level. Thus, a relatively low rate PN code may be selected such that each branch may act as a diversity branch. Specifically, each diversity branch needs a PN code which allows each diversity branch to retain its diversity characteristics. Thus, with the invention, the bandwidth can be reduced since jamming can be eliminated by diversity, thereby making the increase in diffusion code speed unnecessary.

The outputs of these spectrum spreaders 103 and 104 are added together by the combination unit 105. That is, coded multiplexing is performed by the combination unit 105.

The output of the combination unit 105 is input into the transmitter 106, which in turn frequency-converts the signal output by the combination unit 105, and transmits the signal via the transmitting antenna 107. The transmitter utilizes radio frequency (RF) and the frequency is within typical land-fixed digital microwave communications frequencies, and preferably within a range of 1-2 Ghz.

FIG. 2 illustrates the receiver side, which includes a single receiving antenna 108, a receiver 109, an inverse spectrum spreader (e.g., a spectrum de-spreader) 110 which is a first spectrum de-spreader 1, a spectrum de-spreader 111 which is a second spectrum de-spreader 2, a demodulator 112, a demodulator 113, a complex multiplier 114, a complex multiplier 115, a complex correlator 116, a complex correlator 117, a combination unit 118, an adaptive matched filter 119, and an adaptive equalizer 120. The structure of the individual elements of FIG. 2 is believed to be well-known to one of ordinary skill in the art, and thus for brevity will not be discussed in detail.

The receiver side also operates preferably within the 1-2 Ghz range, with signals down-converted to the intermediate frequency of, for example, about 70 MHZ, and so forth to the baseband frequency. The data rate may be in a range between approximately 256 Kbps to approximately 1 Mbps.

At the receiver side of FIG. 2. Initials are received by the receiving antenna 108 and are input to the receiver 109. The receiver 109 low-noise amplifies the signals, and converts them from a radio frequency (RF) to an intermediate frequency (IF). An output of the receiver 109 is branched into two branches by the distributor 100, and input into the first and second spectrum de-spreaders 110 and 111, respectively.

The first spectrum de-spreader 110 performs inverse diffusion (e.g., de-spreading) with the same spreading code as the first spectrum spreader 103 on the transmitter side, and demodulates signals of the first branch of the coded multiplexing signals. Similarly, the second spectrum de-spreader 111 performs inverse-spreading (de-spreading) with the same spreading code as the second spectrum spreader 104 on the transmitter side, and demodulates signals of the second branch of the coded multiplexing signals.

Outputs of the spectrum de-spreaders 110 and 111 are input into the demodulators 112 and 113, respectively, so that demodulation is performed corresponding to the modulation performed by the modulator 101 on the transmitter side. Outputs of the demodulators 112 and 113 are input into the complex multipliers 114 and 115, respectively, and multiplied by weight coefficients W1 and W2 (discussed below), produced by complex correlators 116, 117, respectively.

Outputs of the complex multipliers 114 and 115 are added together by the combination unit 118 to form a combined signal, and the combined signal is input into the adaptive matched filter 119.

An output of the adaptive matched filter 119 is input into the adaptive equalizer 120 where data signals are produced (e.g., determined), and the resultant decision data signals are fed back to the adaptive matched filter 119, and used for calculation of the correlation for adaptive matched filtering.

Additionally, a decision error signal E from the adaptive equalizer 120 is fed back to the complex correlators 116 and 117. The complex correlators 116, 117 correlate the received signals of the first and second branches with the decision error signal of the adaptive equalizer 120, respectively, and the correlation values are multiplied as the weight coefficients of the complex multipliers 114 and 115, respectively.

In the present invention shown in FIG. 1, coded multiplexing is used for obtaining the diversity branch and reduction of the number of transmitter antennas. The diversity effect is attained at the receiver by using the matched filter (MF) for the time diversity effect. This is referred to as "implicit diversity gain", which is different from "explicit diversity gain" or typically referred to as ordinary space or frequency diversity. The reasons that coded multiplexing is used is to share the frequency band for diversity. This enables sending diversity signal within the band of only one signal. Thus, with the invention, a plurality of antennae are unnecessary, unlike in the conventional systems, and a smaller more compact system results.

Furthermore, while the conventional systems supply a diversity combination output to the AGC amplifier, and correlates the received signal branches based thereon, the present invention utilizes the error signals from the adaptive equalizer. The error signals are used for the adaptive cancellation through the multiple branch linearly combining MMSE. The advantages of utilizing the error signals include the present invention providing the interference cancellation under the D/U≅0 or positive values where in the conventional method (and apparatus) it could not be applied.

Hereinbelow, the operation of the inventive apparatus and method is described below in detail with reference to FIG. 3.

Figure 3:
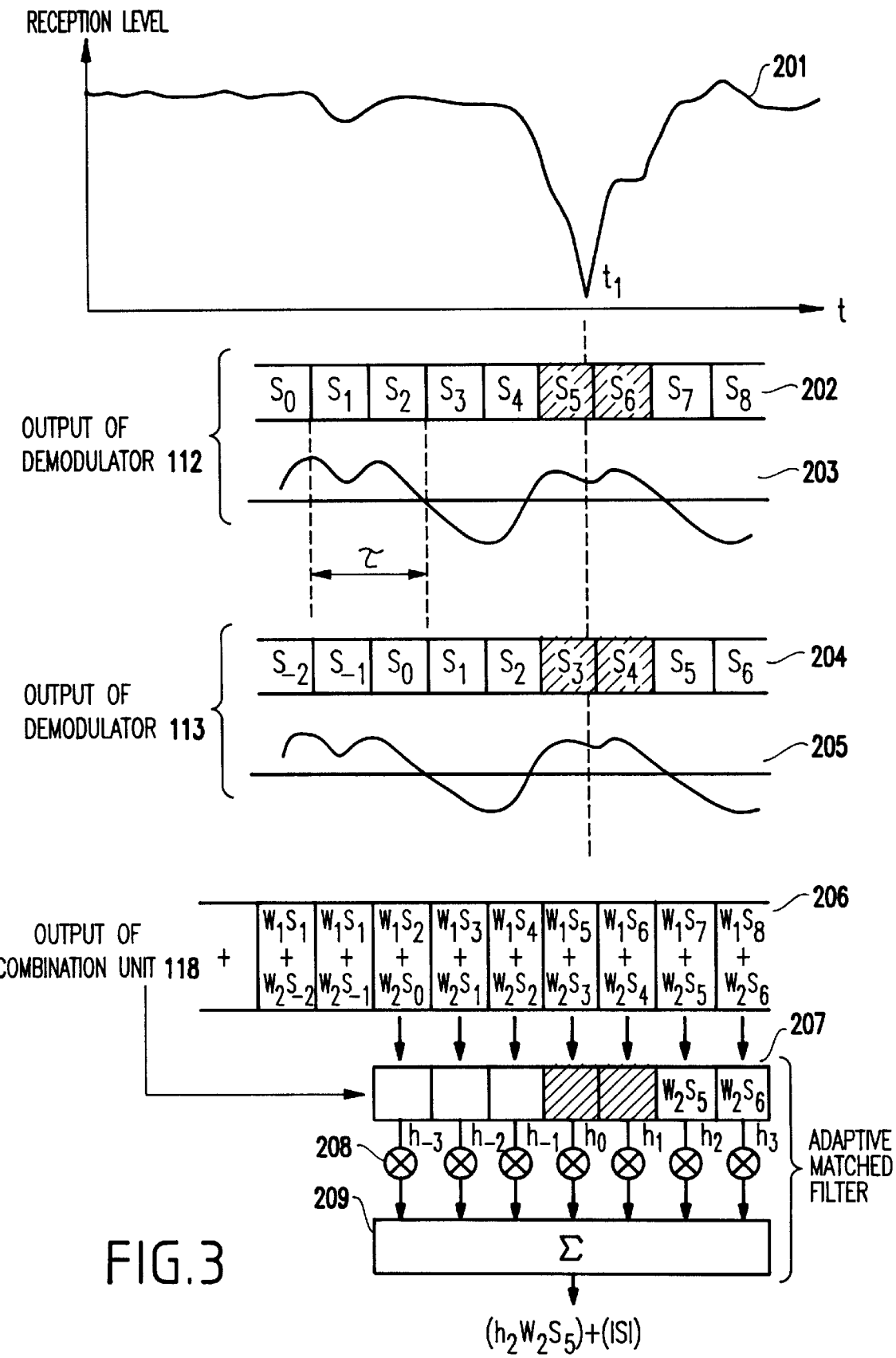
FIG. 3 is a time chart representing operation of each section of the apparatus (e.g., diversity receiver) according to the present invention.

FIG. 3 illustrates a graph 201 which shows temporal variation in the received signal level, an arrangement of data 202 in the desired signal wave in the output of the demodulator 112, a temporal waveform 203 of interference wave components in the output of the demodulator 112, an arrangement of data 204 in the desired signal wave in the output of the demodulator 113, a temporal waveform 205 of interference wave components in the output of the demodulator 113, an arrangement of data 206 when noted on the desired signal wave in the output of the combination unit 118, a diagram 207 for illustrating the complex multiplier at each tap of the adaptive matched filter 119, and a diagram 209 showing an adder of the adaptive matched filter 119.

When the reception level fades at time t1 as indicated by reference numeral 201 in FIG. 3, corresponding data S5 and S6 in the data series 202 of the received signal in the output of the demodulator 112 are momentarily shut down (e.g., inaccessible). Similarly, data S3 and S4 in the data series 204 of the received signal in the output of the demodulator 113 are also momentarily shut down.

When only the data series of the desired signal wave is noted, the output of the combination (e.g., summing) unit 118 becomes a sum of the data series of two branches as indicated by 206 in FIG. 3. The series shown in the upper of the series 206 is the series 202 multiplied by the weight coefficient W1 of the first branch (1). The series shown in the lower of the series 206 is the series 204 multiplied by the weight coefficient W2 of the second branch (2).

In FIG. 3, examples 207–209 are shown of components representing the adaptive matched filter 119. In the present case, it exemplifies a seven-tap arrangement for seven data symbols. The number of taps is dependent on the dispersion of the wave. The matching filter should cover the dispersion of the wave. The tap coefficient is adjusted to minimize the error signal and allows MMSE to be minimized.

Additionally, FIG. 3 shows that the series 206 in the output of the combination unit 118 is input into a shift register 207 of the adaptive matched filter 119.

Usually, the center tap of the adaptive matched filter 119 is utilized as the reference tap, as is usual. Specifically, the center tap is normally selected as the reference tap. Edge taps are avoided, if possible, as reference taps since the diversity effect cannot be achieved by using them. The reference tap is a tap for treating the signal input thereto as the principal wave.

In FIG. 3, for example, the center tap 207 stores (W1·S5+W2·S3) of the series 206. This signal is multiplied by a tap coefficient $h_0$ at the central multiplier 208. Here, it is assumed that $h_0$ ·W1·S5 forms the principal wave component.

However, all signals stored in two of the taps which are multiplied by subsequent tap coefficient $h_1$ are momentarily shut down (e.g., missing or inaccessible) due to fading and are shaded in FIG. 3 (207).

However, the second and third taps to the right from the center tap 207 contain signal components of W2·S5 and W2·S6. If S5 is the reference signal, then when contents in each tap are correlated with the decision data of S5, a correlation value is obtained for the above-mentioned W2·S5. That is, S5 is supplied from the $h_2$ tap which is the tap second to the right from the center tap.

Thus, even if the first branch has been momentarily shut down, the signal can be recovered from the second branch. Similarly, for S6, recovery can be attained from S6 at the second branch. This feature arises from the delay difference τ provided across the branches, and is equivalent to the time diversity.

The interference wave is suppressed during the de-spreading at each diversity branch. However, interference waves with a very high level due to continuous wave (CW) interference in a narrow band (e.g., in a range of less than 1 kHz band) may not be suppressed. If these interference waves have no correlation between the branches, then it is impossible to eliminate the interference. However, if the interference waves are correlated between the branches, then the interference may be eliminated.

FIG. 3 illustrates examples 203 and 204. In this case, a diversity combination unit formed by the components 114, 115, 116, 117 and 120 performs anti-phase cancellation for interference waves.

This diversity combination forms a so-called adaptive filter which feeds the decision unit error signal of the adaptive equalizer back to the correlators 116 and 117 for calculating the correlation with each branch received signal, and uses the correlation values as the weight coefficients. Therefore, it operates to minimize the mean square of the decision error. The adaptive equalizer 120 itself is also an adaptive filter minimizing the mean square of the decision error. Preferably, the adaptive equalizer 120 is formed by the DFE.

Thus, a dual-loop control system is formed. In such cases, typically difference-for-loop-time constants should be provided, so as to prevent contention and to stabilize the control system. Here, quicker response must be provided for the outer diversity control than the adaptive equalization. To this end, the time constants for the correlators 116 and 117 are set to values lower than that of the time constants of the adaptive equalizer. For example, the time constants for the correlators are preferably 10% (e.g., IT) of the adaptive equalizer time constant.

In FIG. 3, while the interference waves are anti-phase canceled at the output of the combination unit 118, if there is no interference wave(s), control of the minimum mean square error effectively performs diversity combination of signals.

Output of the adaptive matched filter of FIG. 3 is ($h_2$·W2·S5)+(|S|). Here, the first term represents a recovered signal against a momentary shutdown. The second term is an interference (inter-symbol interference) between codes S0–S8 ultimately leaked from other taps. Such ultimate interference between codes is eliminated by the adaptive equalizer 120 of FIG. 2 through adaptive signal processing.

Figure 7:
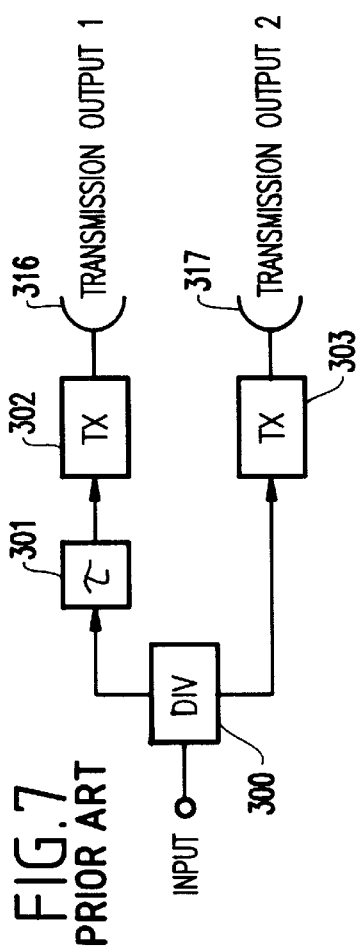
FIG. 7 is a block diagram showing the transmitter side of a conventional diversity receiver.
Figure 8:
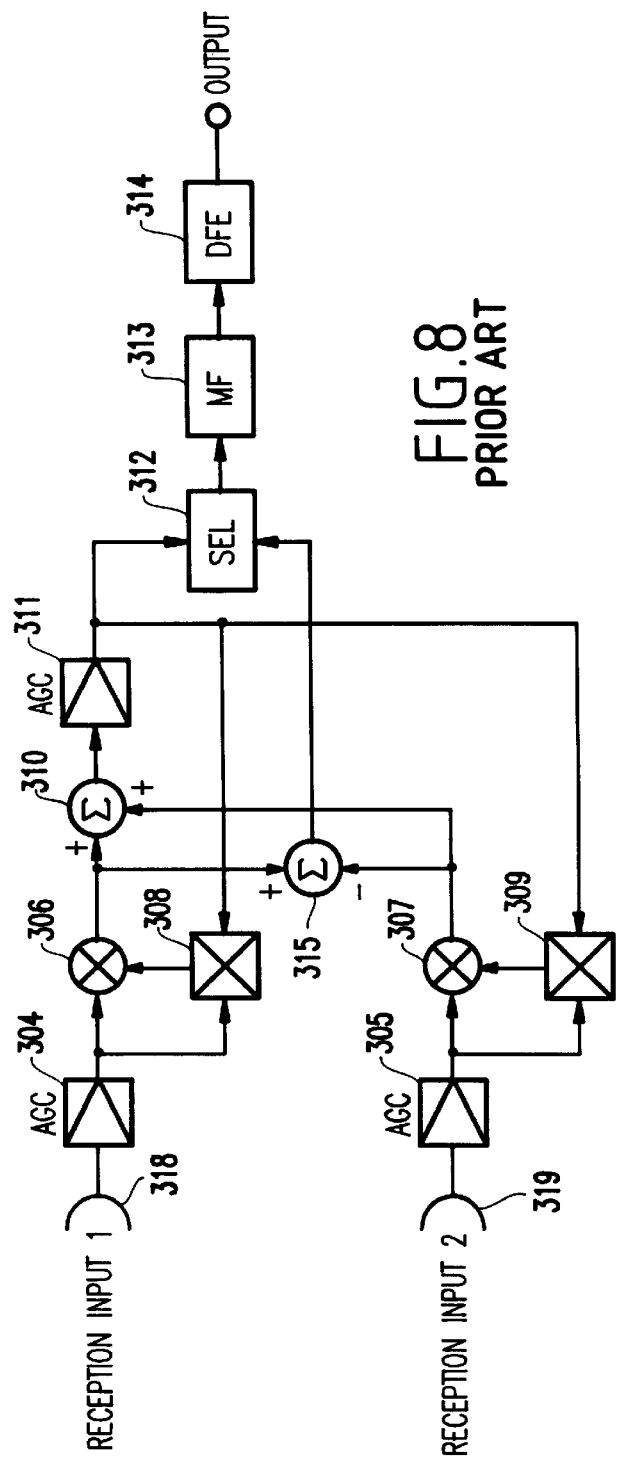
FIG. 8 is a block diagram showing the receiver side of the conventional diversity receiver.

As described above, the present invention uses diversity with coded multiplexing instead of using space diversity as in the conventional systems, and eliminates interference and assures diversity gain for a signal by utilizing diversity with coded multiplexing. Therefore, a plurality of antennae and a switch as in the conventional system of FIG. 7 are unnecessary.

The embodiment described above is a method for compensating for interference between codes by modulating transmitting data at the transmitter side, then branching it into two branches for coded multiplexing, and branching the data into two branches at the receiver side.

However, the invention of the application is not limited to such a technique. Indeed, the transmitting data may be branched into N branches (N being integer of 2 or more) at the transmitter side after modulation for coded multiplexing, and to branch them into N branches at the receiver side. For example, FIGS. 4-5 show a second embodiment of the present invention.

Second Embodiment

Figure 4:
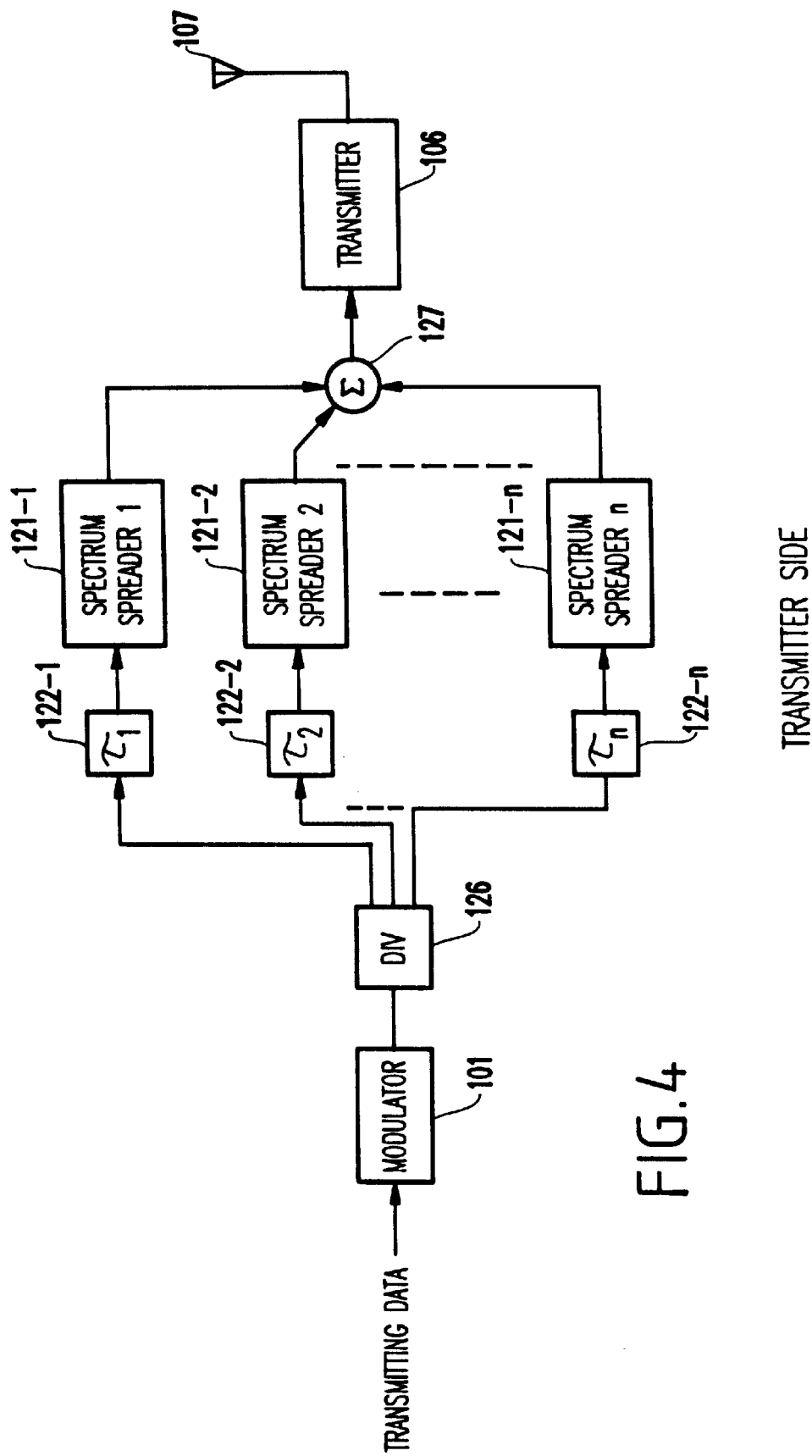
FIG. 4 is a block diagram showing a second embodiment of the transmitter side of an apparatus according to the present invention.

In FIG. 4, transmitted data signals are received and modulated by the modulator 101. Then, the modulated signals are branched into N branches (where N is an integer of at least 2) by an M-branch distributor 126 (wherein M is an integer less than N), and combined by the combination (e.g., summing) unit 127 through retardation (delay) elements 122-1–122-$n$ and spectrum spreaders 121-1–121-$n$, respectively. Retardation elements 122-1–122-$n$ provide a predetermined delay to the divided signals. Consequently, coded multiplexed signals are obtained.

Figure 5:
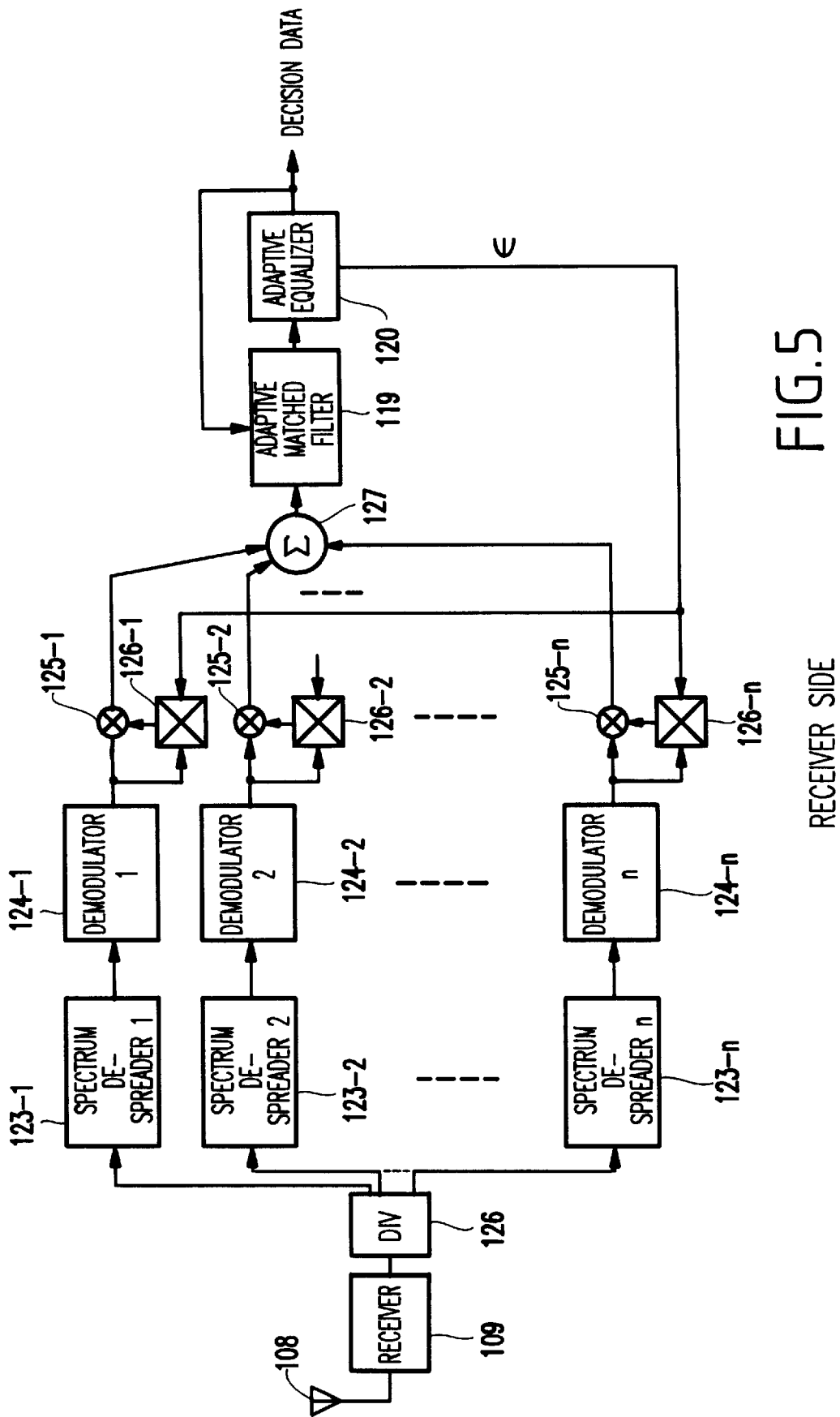
FIG. 5 is a block diagram showing a second embodiment of the receiver side of an apparatus (e.g., diversity receiver) according to the present invention.

Meanwhile, in FIG. 5, a signal is received through a receiving antenna 108 and is provided as an input to a receiver 109. An output of the receiver 109 is branched into M branches by the M-branch distributor 126, de-spread by spectrum de-spreaders 123-1–123-$n$, and then demodulated by demodulators 124-1–124-$n$.

Outputs of the demodulators 124-1–124-$n$ are input into complex multipliers 125-1–125-$n$, and multiplied by weight coefficients W1–W$n$, respectively.

Outputs of the complex multipliers 125-1–125-$n$ are added together by the combination unit 127, and then input into an adaptive matched filter 119.

An output of the adaptive matched filter 119 is input into an adaptive equalizer 120 where the data signals are processed to output decision data. The resultant decision data signal is fed back to the adaptive matched filter 119, and used for calculation of correlation data for the adaptive matched filtering. Additionally decision error signals of the adaptive equalizer 120 are fed back to complex correlators 126-1–126-$n$.

These complex correlators 126-1–126-$n$ correlate the demodulated signals from the demodulators 124-1–124-$n$ with the decision error signals from the adaptive equalizer 120. The correlation values are multiplied as weight coefficients for the complex multipliers 125-1–125-$n$, respectively.

As described above with the present invention a plurality of antennae as typically used in the space diversity are eliminated. Instead, diversity is formed with coded multiplexing through spread spectrum techniques. Thus, the scale and cost of the apparatus can be significantly reduced.

Additionally, interference waves are eliminated in a region where D/U is distributed from positive to negative. As mentioned above, such elimination of interference waves was extremely difficult in the conventional systems. Further, the present invention ensures diversity gain for desired waves.

Third Embodiment

The above-described first and second embodiments are especially effective for providing a small compact system having one antenna and providing diversity through code multiplexing, and providing a minimum mean square error technique effective for normal interference (e.g., D/U$\geq$0dB. However, D/U<−6 dB is not applicable. As mentioned above with regard to the conventional system, D/U<0 represents a severe jamming environment and this environment is targeted by the conventional multiple antenna/PIAA system.

Figure 6:
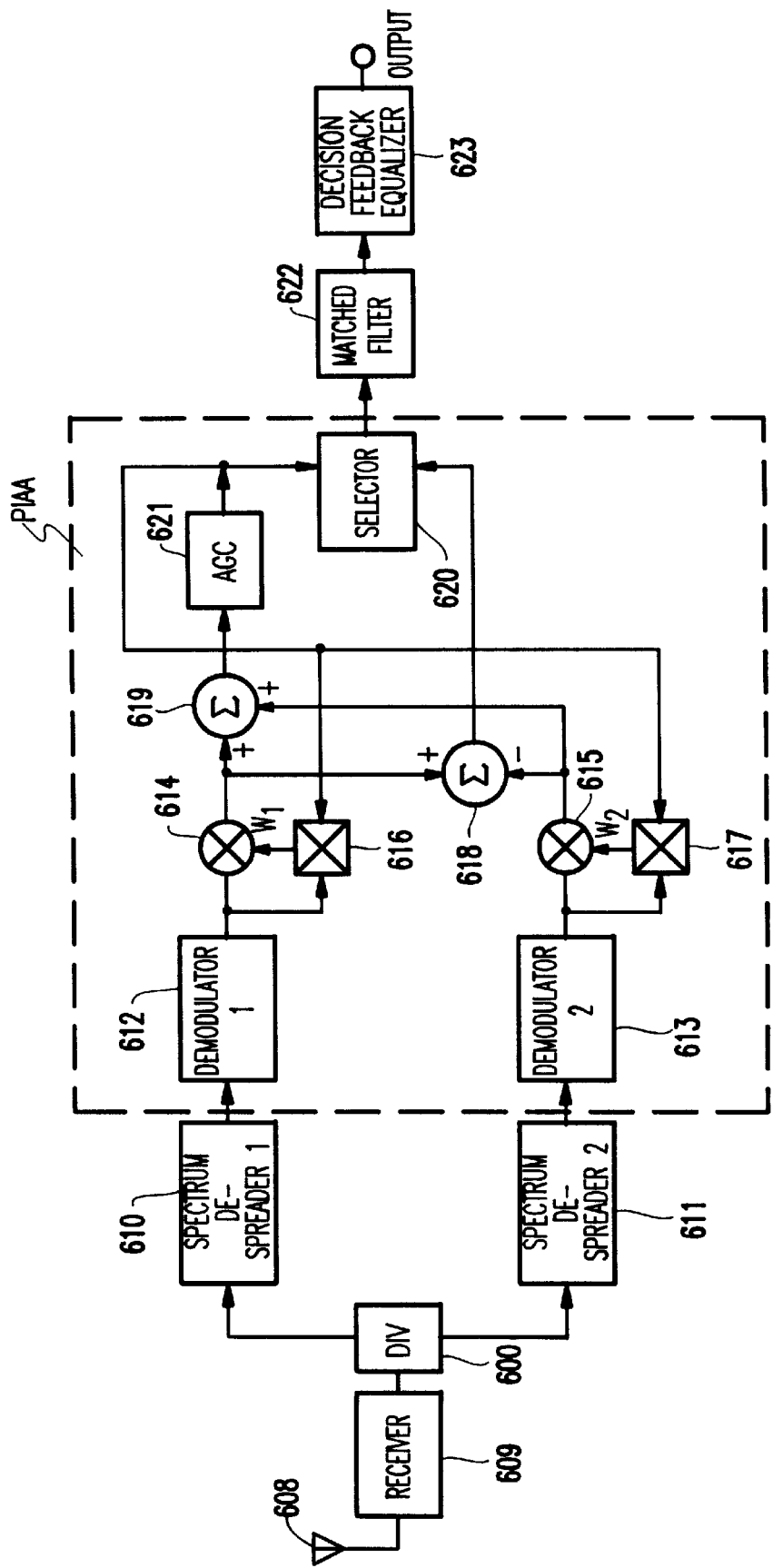
FIG. 6 is a block diagram showing a third embodiment of the receiver side of an apparatus (e.g., diversity receiver) according to the present invention.

In view of the foregoing, a third embodiment of the present invention, as shown in FIG. 6, is directed to providing a small compact system having one antenna and providing diversity through code multiplexing, and providing a PIAA system suitable for environments in which D/U<0 dB. Thus, with the third embodiment, the number of antennae is reduced over the conventional system and yet a smaller system results in which a stronger interference cancellation effect results since the spread spectrum reduction technique also is employed. If D/U≈0 or D/U is positive, then the MMSE technique of the first and second embodiments is employed.

Before turning to the structure of the receiver side of the third embodiment as shown in FIG. 6, it is noted that the transmitter side is substantially identical to that of FIG. 1 (and indeed is similar to that of FIG. 7 but provides spread spectrum techniques including first and second spectrum spreaders 1 and 2 as shown in FIG. 1).

Turning to the receiver side of the third embodiment as shown in FIG. 6, the receiver uses a single antenna and the spectrum de-spreaders and coded multiplexing to achieve the diversity effect, as in the first embodiment. However, instead of the minimum mean square error (MMSE) technique the receiver of the third embodiment employs a power inversion adaptive array (PIAA) similar to that of U.S. Pat. No. 5,335,359, incorporated herein by reference.

As a result, the size of the receiver is small but it can compensate severe interference (e.g., D/U<0 dB) and can still have diversity through the coded multiplexing.

At the receiver side of FIG. 6, microwave signals are received by the receiving antenna 608 and are input to the receiver 609. The receiver 609 low-noise amplifies the signals, and converts them from a radio frequency (RF) to an intermediate frequency (IF). An output of the receiver 609 is branched into two branches by the distributor 600 (e.g., a hybrid splitter), and input into the first and second spectrum de-spreaders 610 and 611, respectively.

The first spectrum de-spreader 610 performs de-spreading with the same spreading code as the first spectrum spreader on the transmitter side, and demodulates signals of the first branch of the coded multiplexing signals. Similarly, the second spectrum de-spreader 611 performs despreading with the same spreading code as the second spectrum spreader on the transmitter side, and demodulates signals of the second branch of the coded multiplexing signals.

Outputs of the spectrum de-spreaders 610 and 611 are input into the demodulators 612 and 613, respectively so that demodulation is performed corresponding to the modulation performed by the modulator on the transmitter side. Outputs of the demodulators 612 and 613 are input into the complex multipliers 614 and 615 respectively, and multiplied by weight coefficients W2 and W1 produced by complex correlators 616, 617, respectively.

An output of the complex multiplier 614 is input to a combination (subtractor) unit 618 and to a combination (summing) unit 619. Similarly, an output of the complex multiplier 615 is input to the subtractor unit 618 and to the summing unit 619. The subtractor unit 618 combines the inputs from the complex multipliers 614, 615 together to form a combined signal. The combined signal is input into a selector 620 which may be a changeover switch or the like. The selector is suitably controlled to output one of the output from an automatic gain control (AGC) circuit 621 or the output of the combination unit 618. In the absence of fading or the like, the selector 620 is in a first position for selecting the output of the AGC circuit 621. In contrast, during a deep fade the selector 620 is set to a second position to couple the output of the subtractor unit 618 to the matched filter 622.

The second outputs from the complex multipliers 614, 615, having been inputted to the summing unit 619 are added to form complex values (e.g., consisting of a real part and an imaginary part) and an output of the summing unit 619 is input to an automatic gain control (AGC) circuit 621 for normalization to minimize fluctuations and the like.

The receiver side applies AGC to an output of the summing unit 619, and feeds back the output to the correlators 616 and 617 for correlating with received branch signals. When the output of the summing unit 619 and the received signals are correlated with each other, the phase difference between the output of the summing unit 619 and each received signal, and their amplitude information are obtained as correlated values.

The in-phase composition is attained by multiplying a complex conjugate of these correlated values by the multipliers 614, 615. Since the amplitude is multiplied by a weight coefficient making it square, composition at the maximum ratio is consequently performed for the received signal having a high level.

On the other hand, the subtractor unit 618 performs an anti-phase composition opposite to the maximum ratio composition to suppress a signal having a high level. If the signal having a high level is unnecessary interference jamming, then interference waves are subject to an in-phase composition at the output of the summing unit 619, while they are canceled in anti-phase as the output of subtractor unit 618.

Accordingly, a desired signal can be extracted from the output of the subtractor unit 618. When the desired wave at the output of the subtractor unit 618 is present, it is merely linearly combined by the weight coefficient for cancelling the interference. On the other hand, the transmitting wave is provided with a delay difference between the branches, so that a fixed delay difference is provided for the desired wave at the output of the selector 620. An output of the selector is provided to the adaptive matched filter 622, and is input to a decision feedback equalizer 623 to produce a decision error signal output.

Thus, with the third embodiment of the present invention, as shown in FIG. 6, a small compact system is provided having one antenna and providing diversity through code multiplexing, and providing a PIAA system suitable for environments in which D/U<0 dB.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. An apparatus for cancelling interference in a signal, comprising:
    means for diversity-combining signals having a delay difference from a plurality of branches to provide branched data;
    a single transmitting antenna for transmitting said branched data with said delay difference and having been diversity-combined, as transmitted signals;
    means for receiving said transmitted signals, and for diversity-combining said transmitted signals to provide an output signal, said receiving means including:
    a single receiving antenna;
    an adaptive matched filter receiving said output signal; and
    an adaptive equalizer coupled to said adaptive matched filter.

2. An apparatus according to claim 1, further comprising:
    means for branching transmitting data into said plurality of branches and providing said delay difference to each of said branches for code-division-multiplexing.

3. An apparatus according to claim 2, wherein said branching means comprises means for performing a coded multiplexing by using an independent spreading code.

4. An apparatus as set forth in claim 1, wherein said means for diversity-combining said transmitted signals performs a diversity combination in a time region by using a minimum mean-square-error algorithm.

5. An apparatus as set forth in claim 1, wherein said adaptive equalizer comprises a decision feedback equalizer.

6. An apparatus as set forth in claim 2, wherein said adaptive equalizer comprises a decision feedback equalizer.

7. An apparatus as set forth in claim 1, wherein said plurality of branches includes N branches, wherein N is an integer no less than 2.

8. An apparatus for cancelling interference in a signal, comprising:
    a divider for branching transmitting data into a plurality of branches and providing a delay difference to each of said branches for code-division-multiplexing;
    means for diversity-combining signals from said branches;
    a single transmitting antenna for transmitting said branched data with said delay difference and having been diversity-combined, as transmitted signals;
    a receiver for receiving said transmitted signals, and for diversity-combining said transmitted signals to provide an output signal, said receiver including:
    a single receiving antenna.

9. An apparatus according to claim 8, said receiver further comprising:
    an adaptive matched filter for receiving said output signal; and
    an adaptive equalizer coupled to said adaptive matched filter.

10. An apparatus according to claim 9, wherein said divider comprises means for performing a coded multiplexing by using an independent spreading code.

11. An apparatus as set forth in claim 9, wherein said means for diversity-combining said transmitted signals performs a diversity combination in a time region by using a minimum mean-square-error algorithm.

12. An apparatus as set forth in claim 9 wherein said adaptive equalizer comprises a decision feedback equalizer.

13. An apparatus as set forth in claim 9, wherein said plurality of branches includes N branches, wherein N is an integer no less than 2.

14. A diversity reception system, comprising:
    a transmitter and a receiver for receiving signals from said transmitter, said transmitter including:
    means for providing a different delay time for each of a plurality of transmitting signals which comprise a transmitting signal divided into N branches at a transmitter side, wherein N is an integer no less than 2;
    means for individually spectrum spreading said N-branched transmitting signals;
    means for combining said spectrum-spread signals; and
    a single antenna for transmitting said combined signals;
    wherein said receiver includes:
    a single antenna for receiving the combined signals transmitted;
    means for dividing said received signals into N branches, and decoding the divided signals through spectrum de-spreading corresponding to a transmitter side, respectively.

15. A diversity reception system according to claim 14, further comprising:
    means for demodulating a spectrum de-spread output;
    a plurality of multipliers for respectively receiving a demodulated signals for combination to provide combined signals; and an adaptive matched filter for receiving said combined signals and providing an output.

16. A diversity reception system according to claim 15, further comprising:

an adaptive equalizer for receiving said output of the adaptive matched filter; and means for correlating a decision error signal of said adaptive equalizer with said demodulated signals.

17. A diversity reception system as set forth in claim 16, wherein the time constant for a correlation is smaller than that of said adaptive equalizer.

18. A diversity reception system according to claim 17, wherein said adaptive equalizer comprises a decision feedback equalizer.

19. A diversity reception system according to claim 14, said receiver further comprising:

a Power Inversion Adaptive Array (PIAA), said PIAA including:

means for demodulating a spectrum de-spread output;

a plurality of multipliers for respectively receiving a demodulated signals for combination to provide combined signals;

a subtraction unit for subtracting outputs of said plurality of multipliers from one another; and a summing unit for adding outputs of said plurality of multipliers to one another.

20. A diversity reception system according to claim 19, said PIAA further including:

an automatic gain control (AGC) circuit for receiving an output of said summing unit and providing a gain thereto; and a selector for selectively outputting one of an output from said AGC circuit and an output of said subtraction unit.

21. A diversity reception system according to claim 20, further comprising:

an adaptive matched filter for receiving an output from said selector and providing an output.

22. A diversity reception system according to claim 21, further comprising:

an adaptive equalizer for receiving said output of the adaptive matched filter; and means for correlating a decision error signal of said adaptive equalizer with said demodulated signals.

23. A diversity reception system as set forth in claim 22, wherein a time constant for a correlation is smaller than that of said adaptive equalizer.

24. A diversity reception system according to claim 23, wherein said adaptive equalizer comprises a decision feedback equalizer.

25. A method for cancelling interference in a signal, comprising steps of:

branching transmitting data into a plurality of branches and providing a delay difference to each of said branches for coded multiplexing;

diversity-combining said data having said delay difference to provide branched data;

transmitting, by a single transmitting antenna, said branched data with said delay difference as transmitted signals;

receiving, by a single receiving antenna, said transmitted signals;

demodulating, separating, and diversity-combining said transmitted signals, to provide a decision data output.

* * * * *